May 21, 1929.  C. C. FARMER  1,714,008

EXHAUST CONTROLLING DEVICE

Filed July 2, 1926

INVENTOR
CLYDE C. FARMER
BY *Wm. M. Cady*
ATTORNEY

Patented May 21, 1929.

1,714,008

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

EXHAUST-CONTROLLING DEVICE.

Application filed July 2, 1926. Serial No. 120,116.

This invention relates to fluid pressure controlled devices and has for its principal object to provide a fluid pressure exhaust fitting, so constructed as to prevent an operator from closing the exhaust by hand.

While adapted to be employed wherever it is desired to prevent the manual closure of a fluid pressure exhaust port, my improvement is designed more particularly for use in connection with an automatic train control equipment in which the brakes are automatically applied when the traffic conditions in advance are unfavorable.

With certain types of automatic train control equipment, the holding of the apparatus in the operative position for causing the brakes to be applied depends upon an exhaust port being held open, and if the operator wishes to defeat the operation of the apparatus, he could do so, if he were able to close the exhaust port in question. I have accordingly provided an exhaust port fitting which is so constructed that the operator cannot close the exhaust by his hand or fingers.

Figure 1:
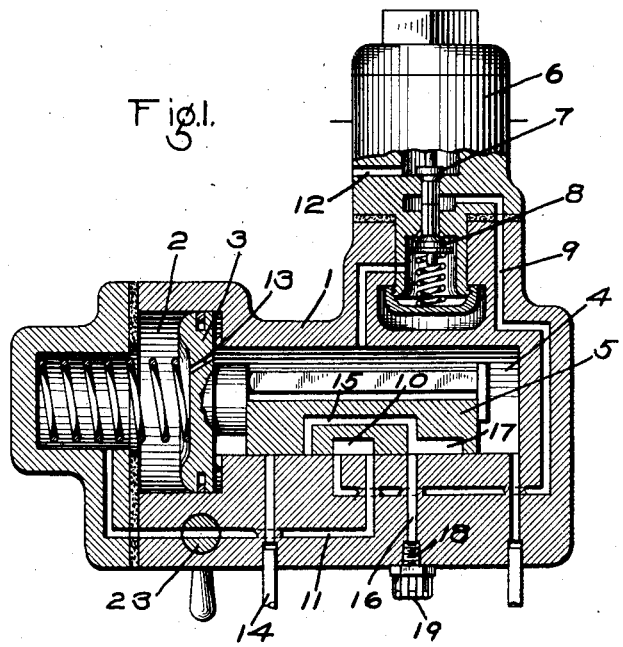
Figure 2:
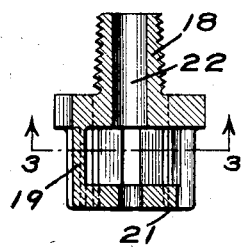
Figure 3:
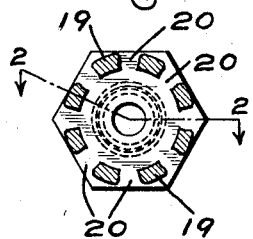

In the accompanying drawing, Fig. 1 is a sectional view of a pilot valve device for a brake application valve device of an automatic train control equipment, showing my exhaust fitting applied thereto; Fig. 2 a section of the exhaust fitting on the line 2—2 of Fig. 3; and Fig. 3 a section on the line 3—3 of Fig. 2.

In order to illustrate an application of my invention, I have shown in the drawing a pilot valve device of the type disclosed in Patent No. 1,553,603 of C. C. Farmer and T. H. Thomas, dated September 15, 1925, and comprising a casing 1 having a piston chamber 2 containing a piston 3 and a valve chamber 4, containing a slide valve 5 adapted to be operated by said piston. The operation of piston 3 may be controlled by a magnet valve device comprising a magnet 6 and double beat valves 7 and 8.

Valve chamber 4 is connected to a passage 9 which is supplied with fluid under pressure and when magnet 6 is energized, the valve 7 is seated and the valve 8 unseated. With valve 8 unseated, fluid under pressure is supplied from valve chamber 4 to passage 9 and thence through cavity 10 in slide valve 5 and passage 11 to piston chamber 2.

When magnet 6 is deenergized, the valve 8 is seated and the valve 7 is unseated, so that fluid under pressure is vented from piston chamber 2 to exhaust port 12. Fluid under pressure is then vented from piston chamber 2 faster than it can equalize through the restricted port 13 in poston 3 and consequently piston 3 is shifted outwardly by the fluid pressure in valve chamber 4. In the outer position of slide valve 5, a pipe 14 is connected, through a cavity 15 in the slide valve with an atmospheric exhaust port 16. The pipe 14 is connected to an application valve device (not shown) which is adapted, when fluid is vented from pipe 14, to be actuated so as to effect an application of the brakes.

In this position of slide valve 5, an extension 17 of cavity 15 connects passage 11 with exhaust port 16, so as to maintain the piston chamber 2 at atmospheric pressure and prevent the release movement of the pilot valve device even when the magnet 6 is again energized.

It has been found that in some instances, the operator will place his thumb over the outlet opening of the exhaust port 16 so as to cut off the exhaust of air from piston chamber 2 and thus permit the release movement of piston 3, by equalization of fluid under pressure through port 13. When the pilot valve device moves to release position, the application valve device also moves to release position and causes the brakes to be released.

According to my invention, an exhaust fitting is applied to the exhaust port 16, which is so constructed that the operator cannot close the exhaust by his hand or thumb. Said fitting may comprise a casting having a threaded extension 18 adapted to be screwed into the outlet of the exhaust port 16 and having a cage-like portion comprising a tubular section 19 which is provided with slots 20 and having an end wall 21. The threaded extension 18 is provided with a passageway 22, which connects passage 16 with the chamber within the section 19.

With the above construction, the operator cannot close the exhaust with his thumb or fingers, and he is thus prevented from interfering with the normal operation of the apparatus.

In order to prevent the movement of the parts, so as to effect the release of the brakes, a hand operated cock 23 may be provided for controlling communication through passage 11, the cock being so located that it is necessary for the operator to leave the engine cab, in order to close the cock.

Having now described my invention, what I claim as new and desire to secure by Letters Patent, is:—

1. The combination with a valve device including a piston and valve means operated by said piston for connecting the piston chamber of said piston with an exhaust port, of a fitting applied to said exhaust port comprising a body having a plurality of openings communicating with said exhaust port, and so disposed as to prevent manual closure by the operator.

2. In an automatic train control equipment, the combination with a valve device comprising a piston and valve means operated by said piston for connecting the piston chamber of said piston with an exhaust port and having means for supplying fluid under pressure to said piston chamber, of a fitting applied to said exhaust port comprising a body having a plurality of openings communicating with said exhaust port, and so disposed as to prevent the operator from manually cutting off the escape of fluid from said piston chamber through said exhaust port.

3. In an automatic train control apparatus, the combination with a pilot valve device comprising a piston, valve means operated by said piston, and a magnet controlled valve for venting fluid under pressure from the piston chamber containing said piston, said valve means being operated by said piston to connect said piston chamber to an exhaust port, of a member connected to said exhaust port having a plurality of openings communicating with said exhaust port and so disposed as to prevent the manual closure of said exhaust port by the operator.

4. The combination with a valve device including a piston and valve means operated by said piston for connecting the piston chamber of said piston with an exhaust port, of means for preventing the closure of said exhaust port by the hand of the operator.

In testimony whereof I have hereunto set my hand.

CLYDE C. FARMER.